United States Patent

[11] 3,561,738

| [72] | Inventor | Sergio F. Galeano |
| | | Toledo, Ohio |
| [21] | Appl. No. | 798,198 |
| [22] | Filed | Feb. 10, 1969 |
| [45] | Patented | Feb. 9, 1971 |
| [73] | Assignee | Owens-Illinois, Inc. |
| | | a corporation of Ohio |

[54] AERATION APPARATUS
1 Claim, 5 Drawing Figs.

[52] U.S. Cl. .................................................. 261/92,
261/120; 210/242
[51] Int. Cl. ...................................................... C02c 1/10
[50] Field of Search ........................................... 261/92, 91,
120; 210/242

[56] References Cited
UNITED STATES PATENTS

| 2,684,941 | 7/1954 | Pasveer ........................ | 261/92X |
| 3,109,875 | 11/1963 | Schramm et al. ............ | 261/92 |
| 3,208,734 | 9/1965 | Wood et al. .................. | 261/91X |
| 3,322,410 | 5/1967 | Ahlenius ...................... | 261/92 |

*Primary Examiner*—Tim R. Miles
*Attorneys*—A. J. Steger and E. J. Holler

ABSTRACT: An improved liquid aeration device which comprises a power driven, floating cylindrical rotor structure with an inclined baffle located in the downstream portion of the rotor, the rotor being immersed and rotated through the liquid being aerated, thereby causing particles of the liquid to be impinged upon the baffle so as to cause substantial turbulence and the transfer of large quantities of air into the liquid.

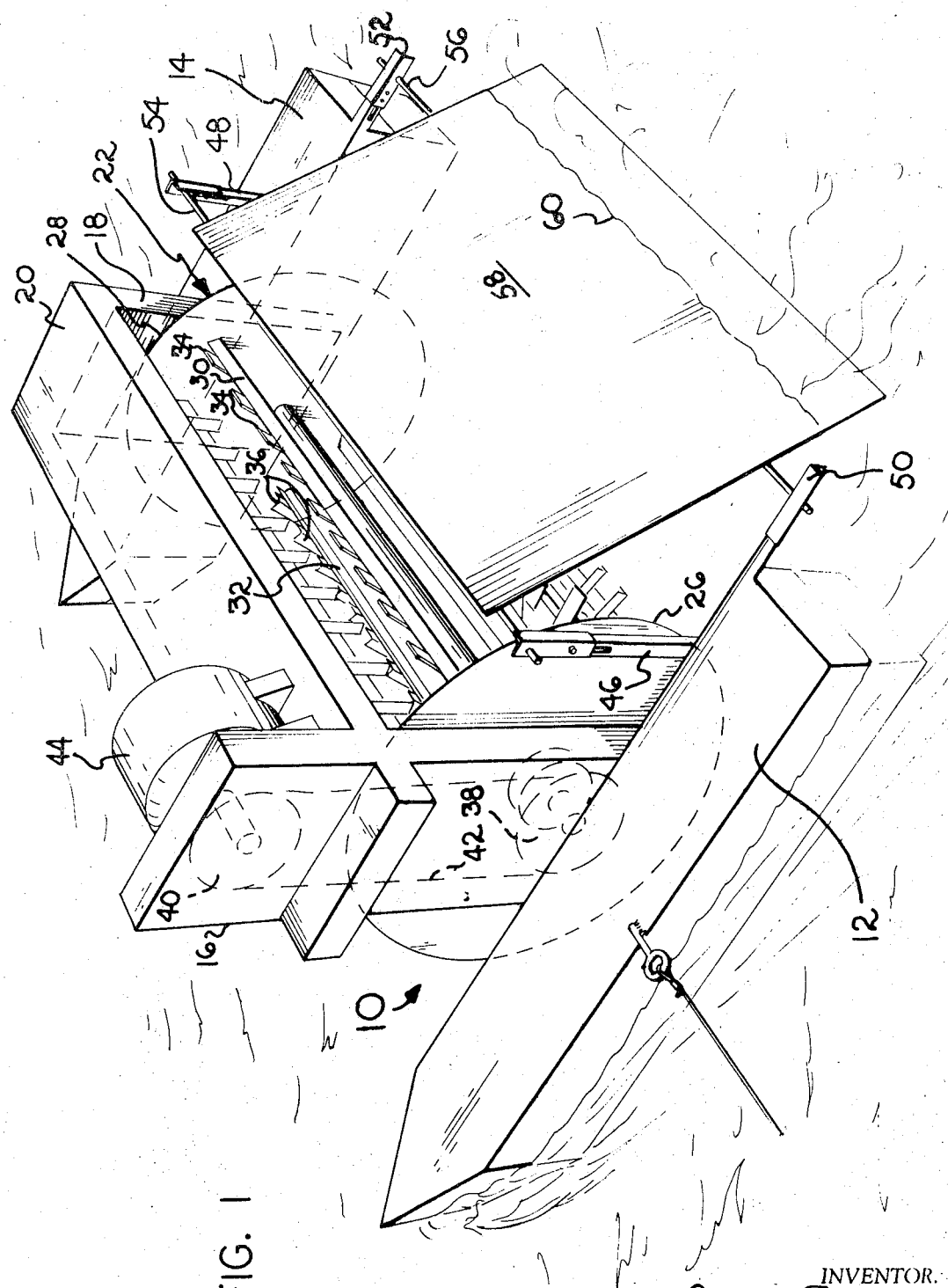

INVENTOR.
SERGIO F. GALEANO
BY A.J. Steger
 & E.J. Holler
ATTORNEYS

PATENTED FEB 9 1971
3,561,738
SHEET 3 OF 3
FIG. 5
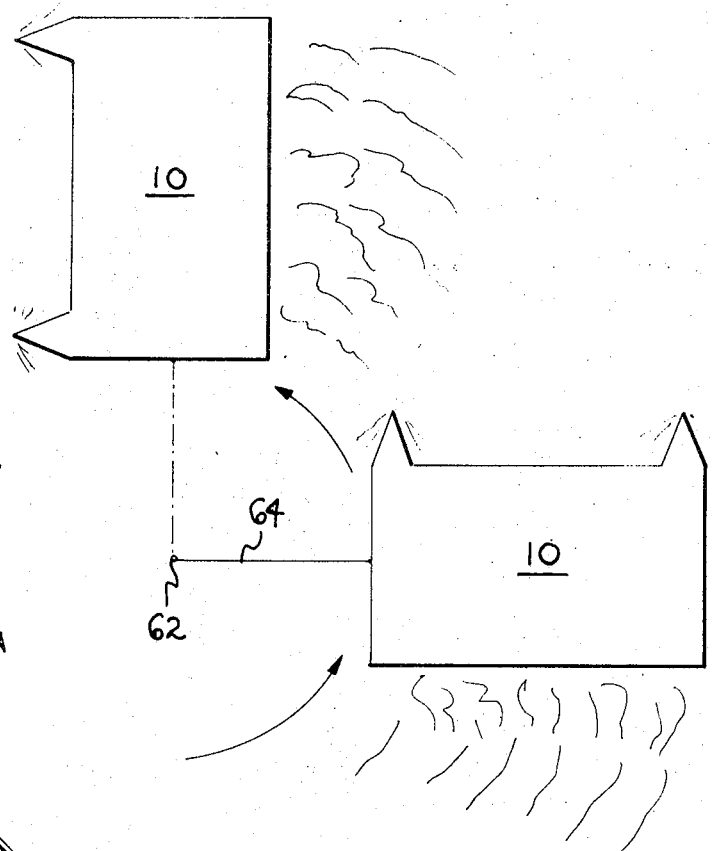
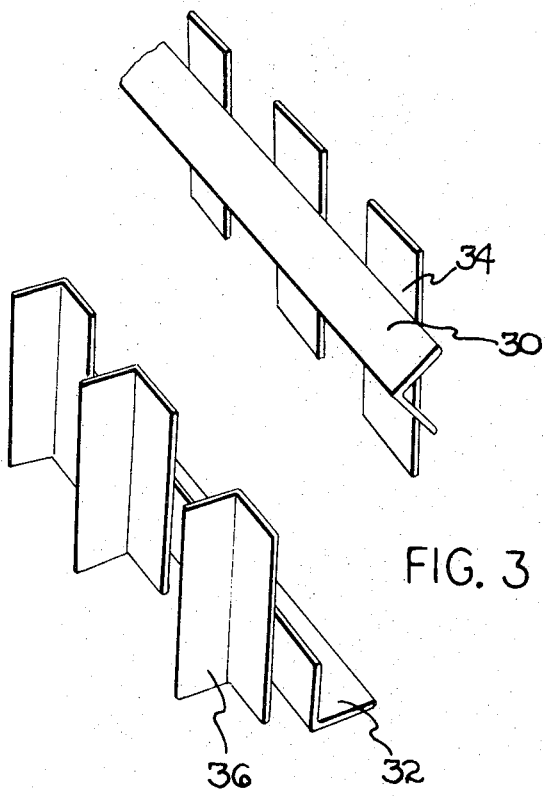
FIG. 3
INVENTOR.
SERGIO F. GALEANO
BY
A.J. Steger
E.J. Holler
ATTORNEYS

AERATION APPARATUS

BACKGROUND OF THE INVENTION

This invention relates to a brush-type liquid aerator which has been modified to improve its oxygen transfer efficiency by the addition of an inclined baffle adjacent to the downstream portion of a rotor.

Aeration rotors are well known in the art for the aeration of sewage and industrial wastes in conventional activated sludge plants. They are also known for the aeration of ponds or lakes wherein the decomposable matter in the waste is stabilized by introduction of the necessary amount of oxygen so as to produce an aerobic decomposition. In other words, when the waste is not supplied with the necessary oxygen to stabilize its decomposition, it will exert a great demand for this necessary on the ponds, lakes or rivers into which it is placed. If such a situation occurs, the oxygen content of these bodies of water will become depleted to a level at which fauna and flora experience objectionable changes.

A number of aeration rotors of the type generally indicated to be the subject matter of this invention have been utilized which include generally a paddle wheel which is operated at a predetermined rotational speed to provide a thorough mixture of surface water and air. The previously used such aeration devices have been successful in introducing some oxygen into the stagnant water; however, they have been seriously limited as to the amount of turbulence they could create and as a result are characterized by low oxygen transfer efficiency.

The possibility of increasing this oxygen transfer efficiency will be better understood by the following simplified mechanism of the oxygen transfer process. This process takes place in three steps. Initially, oxygen molecules are brought into contact with a liquid film. This first step is very rapid. The second step involves the passing of oxygen molecules through the liquid interphase, the thickness of which is generally the equivalent of two or three oxygen molecules. This passing of the oxygen molecules through the liquid interphase takes place by diffusion. It is known that in a turbulent regime, the theory of random motion of the molecules is applicable to the "eddies" of a turbulent regime. Thus, the values for the diffusion constant in turbulent regimes are several times greater than in laminar regimes. The third step consists in the combination of the oxygen molecules into the bulk of the liquid by diffusion and convention. It is also known by varied studies that oxygen transfer into a liquid is liquid-film controlled. It is possible to consider the interface as being replaced by infinitesimally small fresh liquid elements. It should be noted that the aforementioned second step could be separated into two substeps; a surface renewal by fresh liquid elements and a molecular or eddy diffusion. Also, if the turbulence of the liquid is great, the amount of time that the liquid elements reside at the interface would be small, and the transfer process will be accelerated.

SUMMARY OF THE INVENTION

It is therefore an object of this invention to provide an improved aeration device which is characterized by surprisingly greater oxygen transfer efficiency than has been the case with the heretofore known aeration devices.

Another object of this invention is to provide an aeration device which includes a baffle plate in the downstream portion of the rotor to increase the oxygen transfer efficiency.

A further object of this invention is to provide an aeration device which has been modified to make it self-propelled for use in aerating lagoons, ponds, etc.

A still further object of this invention is to provide brush aerator with a rotor utilizing a unique combination of flat and angular paddles or blades for improved turbulence and increased oxygen transfer.

Other objects, features and advantages of this invention will become obvious upon reference to the following detailed description of the invention and the drawings illustrating the preferred embodiments thereof.

IN THE DRAWINGS

FIG. 1 is a perspective view of a floating aeration device incorporating the novel features of this invention.

FIG. 3 is a detailed view of the blade configuration utilized in the rotor of FIG. 2.

FIG. 5 is a schematic view of an arrangement whereby the subject aeration device can be utilized to aerate a large area of the surface of a lagoon or pond.

DESCRIPTION OF THE PREFERRED EMBODIMENT

Figure 2:
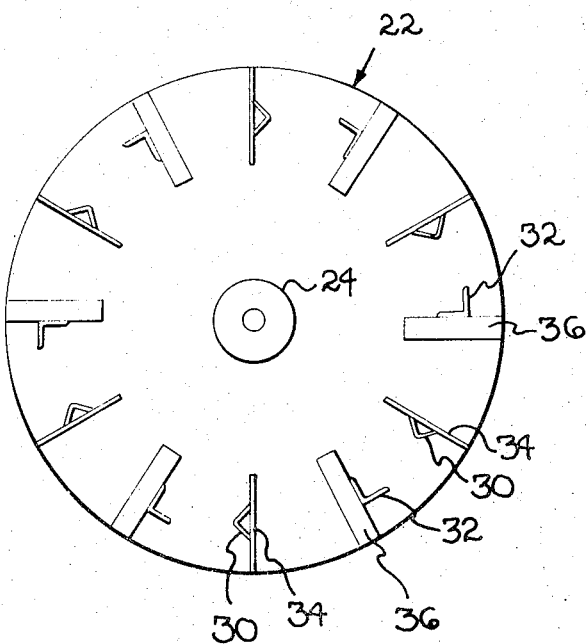
FIG. 2 is an end view of the rotor structure utilized in this invention.

Referring now to the drawings, an aeration apparatus 10 exemplary of the invention includes and floats on a pair of pontoon floats 12 and 14. These pontoon floats may be of any suitable type and size sufficient to support the weight of the aeration apparatus 10. The aeration apparatus 10 further includes two support beams 16 and 18 between which is erected a supporting deck 20. Mounted between the beams 16 and 18 is the aeration rotor generally indicated by the numeral 22. As can be seen by references to FIGS. 1 and 2, the aeration rotor 22 includes a circular shaft 24 which is rotatably mounted between the beams 16 and 18 and which has mounted thereon near its ends a pair of circular blade mounting rotors 26 and 28. Thus, the shaft 24 and the blade mounting rotors 26 and 28 are rotatably mounted to and positioned between the beams 16 and 18 and are positioned below the supporting deck 20. At intervals about the circumference of the blade mounting rotors 26 and 28 are positioned a number of blade supporting ribs 30 and 32. The ribs 30 are right-angled in shape and have attached to their free ends a plurality of flat blades or paddles 34. The ribs 32 are right-angled in shape and have a plurality of right angle-shaped blades attached in face-to-face contact at spaced intervals along their length. The rib members 30 and the rib members 32 being of different orientation and having different shaped blades attached thereto are spaced and alternated around the circumference of the rotors 26 and 28. These different rib and blade configurations are selected so as to accomplish a substantial increase in the turbulence created in the surface of the water being aerated.

Referring again to FIG. 1, the shaft 24 of the rotor device 22 is driven through gears 38 and 40 and chain 42 by a motor 44, which is suitably mounted on the top surface of the deck 20. The motor 44, as shown in this embodiment, is an electrical motor which may be powered by suitable batteries mounted on the deck 20 or by direct connection to a source of electricity. It should be understood that the motor 44 could also be of a gasoline type with a suitable gasoline storage tank also mounted on the deck 20.

Figure 4:
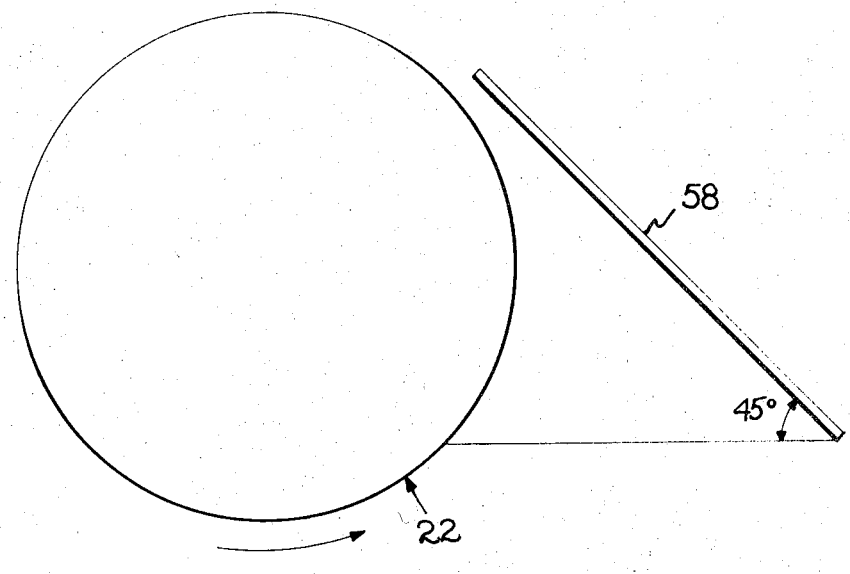
FIG. 4 is a schematic view showing the relative positions of the rotor and baffle plate utilized in this invention

The pontoons 12 and 14 each have a pair of vertically extending mounting brackets 46 and 48 and a pair of horizontally extending mounting brackets 50 and 52 extending therefrom at a position to the rear of the rotor device 22. Mounted to these brackets by means of rods 54 and 56 is a large baffle plate 58. The exact position of the baffle plate 58 may be selected by adjusting the mounting brackets 46 through 52. As can be seen in FIG. 1, the baffle plate 58 is positioned so that its lower end extends below the surface 60 of the water being aerated. It should also be noted in FIGS. 1 and 4 that the baffle plate 58 is positioned at approximately a 45° angle with the surface of the liquid. The combination of the 45° angle and the submerged end of the baffle plate has been found to provide the maximum turbulence within the surface of the liquid. As is shown schematically in FIG. 4, the 45° angle also results in the advantage that the liquid particles being removed from the liquid body by the blades on the rotor 22 are thrown tangentially from the rotor and are impinged perpendicularly against the baffle plate 58, thereby assuring maximum splashing and breaking up of the liquid particles removed. It has been found that increased splashing and particle breakup results in increased oxygen transfer into the water.

When it is desired to utilize the subject aeration apparatus to aerate the surface of a pond or lagoon, an arrangement such as that shown in FIG. 5 may be utilized. Here it is seen that the aeration apparatus 10 is fixed to a pole 62 by means of a cable 64. The pole 62 is suitably anchored so as to maintain a fixed position about which the aeration apparatus 10 may be rotated or tethered. Thus, by varying the length of the cable 64, the subject aeration apparatus can be utilized to aerate a large surface area of a lagoon or pond. If the motor 44 driving the aeration apparatus is to be powered from an electrical source, the electrical lead may be run under water to the pole 62 and then fed to the aeration apparatus 10 through the cable 64. It should also be clear that as the motor 44 drives the rotor device 22, it not only causes the rotation of the blades 34 and 36 and the resultant displacement of water particles from the liquid, but also results in the propulsion of the aeration apparatus over the surface of the liquid body being aerated.

Tests on the subject aeration apparatus utilizing the inventive concept of a baffle plate inclined 45° to the surface of the liquid body being aerated have shown remarkable increases in the oxygen transfer efficiency as compared to similar aeration devices without a baffle plate. For example, with the subject apparatus positioned so that the rotor 22 is immersed approximately 7½ inches beneath the surface of the liquid body being aerated, a 12 percent increase in the oxygen transfer efficiency (lgs. 02/KW-hr.) was noted when the baffle plate was used as compared to the same apparatus without a baffle plate. Even more astounding was the increase of 33 percent in the oxygen transfer efficiency noted with the baffle when the subject apparatus was immersed to a depth of approximately 10 inches below the liquid surface. It should be noted that this increase in the oxygen transfer efficiency also takes into consideration the slight increase in power required to drive the subject aeration apparatus with the baffle plate as compared to driving the aeration apparatus without a baffle plate.

It should be clear that although this invention has been described in connection with the aeration of a large surface area of a lagoon or pond, it is equally well adapted to be positioned at a fixed location in a stream or at waste treatment facilities.

Thus, it should be clear that the subject invention provides a rather simple and economical solution to the problem of aerating a body of oxygen demanding water. The invention further provides an aeration apparatus which utilizes a unique combination of an aeration rotor and a rearwardly mounted baffle plate to achieve increased turbulence and substantially increased oxygen transfer to the liquid body being aerated.

Although but one embodiment of the subject invention has been shown and described in detail, it should be clear to those skilled in the art to which it pertains that many changes and modifications can be made thereto without departing from the scope of the invention.

I claim:

1. A floating self-propelled water aerating unit on a body of water and tethered about a fixed pivot point on said body of water, said unit comprising, in combination:

a frame including float means capable of supporting said frame on the surface of said body of water;

a power driven rotor rotatably mounted on said frame and adapted to be rotated about a horizontal axis into said body of water so as to force particles of water out of and away from said body of water and to propel said aerating unit over the surface of said body of water;

a flat baffle plate mounted on said frame rearward of said rotor at an angle of approximately 45° with the surface of said body of water and extending from substantially above to beneath the surface of said body of water to intercept the particles of water forced out of said body of water by said rotor; and means connecting said frame to said fixed pivot point on said body of water for tethering said unit about said fixed pivot point on said body of water.